United States Patent [19]
Dickey

[11] Patent Number: 4,748,551

[45] Date of Patent: May 31, 1988

[54] CONSTANT CURRENT SUPPLY FOR A VARYING RESISTANCE

[75] Inventor: Richard K. Dickey, San Luis Obispo, Calif.

[73] Assignee: Peroxidation Systems, Inc., Tucson, Ariz.

[21] Appl. No.: 945,374

[22] Filed: Dec. 22, 1986

[51] Int. Cl.[4] ............................................. H02M 7/00
[52] U.S. Cl. ............................................. 363/126; 333/138
[58] Field of Search ............... 363/44, 125, 126, 178; 328/165, 172, 173; 333/20, 32, 138

[56] References Cited

U.S. PATENT DOCUMENTS 4,131,939 12/1978 Day ..................................... 363/126

4,245,294 1/1981 Brolin ................................. 363/126

Primary Examiner—Patrick R. Salce
Assistant Examiner—Jeffrey Sterrett
Attorney, Agent, or Firm—Daniel C. McKown

[57] ABSTRACT

The circuit includes a low-impedance source of a symmetrical alternating voltage wave composed of a fundamental and odd harmonics, and further includes a transmission line having a delay equal to an odd number of quarter cycles of the fundamental, having one end connected to the low-impedance source and the other end connected to the load. The circuit should be useful wherever it is desired to maintain the flow of current constant in spite of variations in the load resistance.

7 Claims, 1 Drawing Sheet

CONSTANT CURRENT SUPPLY FOR A VARYING RESISTANCE

BACKGROUND OF THE INVENTION

1. Field of the Invention

The present invention is in the field of power supplies, and more specifically relates to a power supply suitable for driving a resistive load that varies widely.

2. The Prior Art

A simple, but wasteful, way of achieving the desired result is to place in series with a resistive load a resistor having a resistance that is much greater than the maximum load resistance. Thereby, variations in the load resistance cause only a small percentage change in the total resistance of the circuit and hence in the current that is flowing. The relatively large amount of power dissipated in the added resistor renders this technique undesirable in many applications.

An extension of this technique is often used in power supplies for fluorescent lamps wherein an inductor, also called a ballast, is placed in series with the lamp. In that application, the inductor is useful in permitting the full applied voltage to be impressed on the source initially, to strike an arc within the lamp, and is useful thereafter in limiting the current flow through the lamp after the arc has been struck. The inductor is not as wasteful as the resistor referred to earlier, because the inductor returns the energy stored in it at some point in the cycle.

However, the inductor has the disadvantages of being heavy, because of its windings and possible iron core, and in practice, the inductors must be rather large and heavy, and therefore difficult to mount.

A specialized apparatus known as a metadyne is sometimes used in electric traction systems. It involves the use of a single continuous rotating winding, a commutator, and two sets of brushes. Although the metadyne provides constant torque for traction, it does this only at the expense of requiring massive rotating machinery.

As will be seen below, the present invention overcomes the difficulties inherent in each of these prior art approaches, achieving high efficiency, without the need for any moving parts.

SUMMARY OF THE INVENTION

It is an objective of the present invention to provide an apparatus for forcing a constant current through a load of varying resistance.

It is a further objective of the present invention to provide apparatus for achieving this result without the need for moving parts.

It is a further objective to provide apparatus for supplying either alternating current or direct current to the load.

It is a further objective of the present invention to provide apparatus for forcing a constant current through a load that is located an appreciable distance from the power source.

In accordance with the present invention, these objectives are achieved by connecting the load to a low impedance source of a symmetrical alternating voltage wave composed of a fundamental and odd harmonics through a transmission line having a delay equal to an odd number of quarter cycles of the fundamental.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
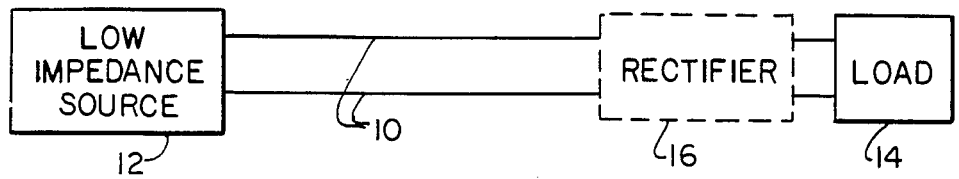
FIG. 1 is an electrical block diagram showing the major components in a preferred embodiment of the present invention.

Turning now to the drawings in which like parts are denoted by the same reference numeral throughout, there is shown in FIG. 1 a block diagram of the apparatus of the present invention connected to a load. The apparatus of the invention includes a low impedance source 12 and a transmission line 10. The rectifier 16 is optional and is used when the load 14 requires a unidirectional current for its operation.

In accordance with the present invention, the low impedance source generates a symmetrical alternating voltage wave that is composed of a fundamental frequency and odd harmonics of the fundamental. The impedance of the source should be substantially less than the characteristic impedance of the transmission line 10.

In accordance with the present invention, the transmission line has a delay equal to an odd number of quarter cycles of the fundamental. This is an important aspect of the invention.

Figure 2:
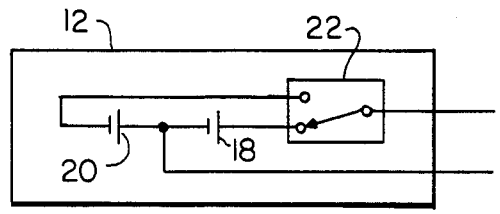
FIG. 2 is a circuit diagram showing a low impedance source.

FIG. 2 shows, in schematic form a low-impedance source of the type contemplated for use in the present invention. The source 12 includes two cells 18, 20 and a single-pole double-throw switch 22 which is driven back and forth between its two states to produce the square wave 24 shown in FIG. 3. It is assumed that the internal resistance of the cells 18, 20 is negligible, or at least low compared to the characteristic impedance of the transmission line 10.

Figure 3:
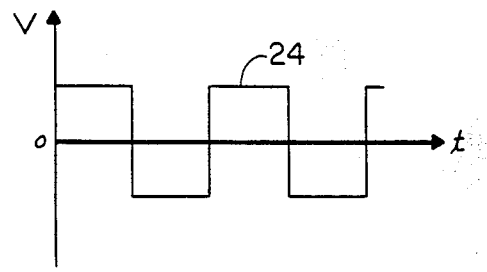
FIG. 3 is a graph showing voltage versus time for the type of wave produced by the low impedance source in a preferred embodiment.

It should be noted that the square wave 24 of FIG. 3 consists entirely of a fundamental frequency and odd harmonics.

Figure 4:
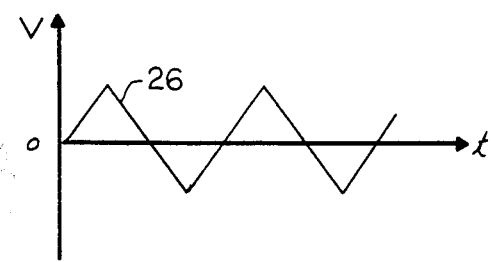
FIG. 4 is a graph showing voltage versus time for an alternative type of wave that could be used in the present invention.

In an alternative embodiment, a low-impedance source that produces the triangular wave 26 shown in FIG. 4 is used. The triangular wave 26, like the square wave 24, consists of the fundamental and odd harmonics only.

Figure 5:
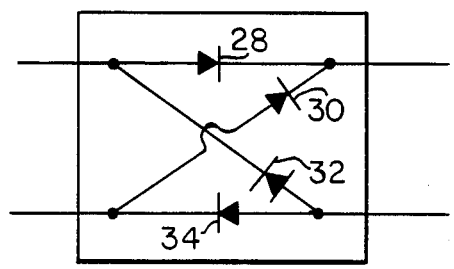
FIG. 5 is an electrical diagram showing a type of rectifier that could be used in the present invention.

FIG. 5 shows a circuit that could be used to provide the optional rectifier 16 of FIG. 1. The diodes 28, 30, 32, and 34 of FIG. 5 are connected to form a full-wave rectifier.

Typically, transmission lines are used to transmit sinusoidal signals, and it is somewhat surprising that the transmission line 10 can be used for waves of the type shown in FIG. 3 and 4. The explanation is that because the transmission line has a delay equal to an odd number of quarter cycles of the fundamental, it necessarily has a delay equal to a different odd number of quarter cycles of the odd harmonics. Therefore, the line is tuned for the harmonics as well, and they are propagated in the same manner as the fundamental.

It can be shown theoretically that if only the fundamental sine wave is used to transmit power to a load through a tuned transmission line having delay equal to an odd number of quarter cycles of the fundamental, the current delivered to the load will be independent of the resistance of the load. The present inventor has found that this result also holds for waveforms that are composed of a fundamental and odd harmonics only.

Thus, the present invention operates so as to drive a constant current through the load regardless of the load resistance.

Figure 6:
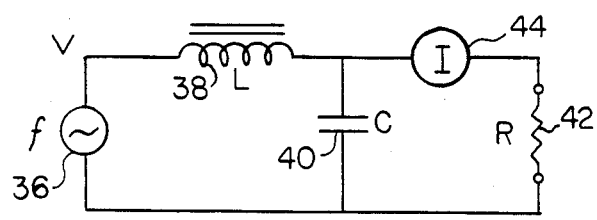
FIG. 6 is an electrical diagram showing an extreme form of the circuit of the present invention.

This result, though striking, is made more plausible by the analysis of the circuit shown in FIG. 6. It will be recognized that the circuit shown in FIG. 6 is a degenerate form of the circuit of FIG. 1. A generator 36 produces a sine wave of amplitude V which is impressed on a series LC circuit consisting of the inductor 38 and the capacitor 40. A load resistor 42 is connected in parallel with the capacitor, and the current to the load resistor 42 is measured by the ammeter 44. Analysis of this circuit shows that if the values of L and C are selected so that $$f = \frac{1}{2\pi \sqrt{LC}}$$

then the current I flowing through the load resistor is given $$I = V\sqrt{\frac{C}{L}}$$

From this latter equation it can be seen that when the LC circuit is tuned to the frequency of the source 36, similar to the transmission line 10 being tuned to the low-impedance source 12 of FIG. 1, then the current forced through the load resistor 42 is independent of the load resistance.

Figure 7:
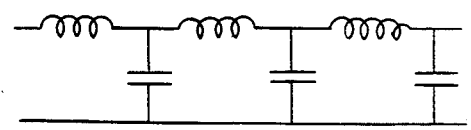
FIG. 7 is an electrical diagram showing a transmission line composed of discrete elements.

It is well known, that the transmission line 10 can consist of interconnected discrete elements (as shown in FIG. 7) or, alternatively, its inductive and capacitive elements can be distributed along its length. In a special case, the transmission line 10 may consist of two spaced conductors.

Thus, there has been shown a circuit for forcing a chosen current to flow through a load even though the resistance of the load may vary greatly. The system requires no moving parts, and efficiencies of 96 percent have been obtained.

It is believed that the circuit of the present invention has wide industrial applicability. Although it was developed for use in driving gas discharge lamps, such as mercury vapor lamps, the circuit would be attractive for use with an electric motor, in which application the motor would have constant torque regardless of its speed. Other uses appear likely in driving a pump to obtain a constant pressure and in electric traction vehicles.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. Apparatus for forcing the current flowing through a load to be constant, regardless of variations in the impedance of the load, said apparatus comprising:
   a low-impedance source of a symmetrical alternating voltage wave composed of a fundamental and odd harmonics;
   a transmission line having a delay equal to an odd number of quarter cycles of the fundamental, having one end connected to said low-impedance source and having its other end connected to the load.

2. The apparatus of claim 1 wherein said symmetrical alternating voltage wave is a square wave.

3. The apparatus of claim 1 wherein said symmetrical alternating voltage wave is a triangular wave.

4. The apparatus of claim 1 wherein said transmission line further consists of interconnected discrete elements.

5. The apparatus of claim 1 wherein said transmission line is a distributed element transmission line.

6. The apparatus of claim 5 wherein said transmission line further consists of two spaced conductors.

7. The apparatus of claim 1 further comprising a rectifier and wherein said other end of said transmission line is connected to the load through said rectifier.

* * * * *